Figure 1:
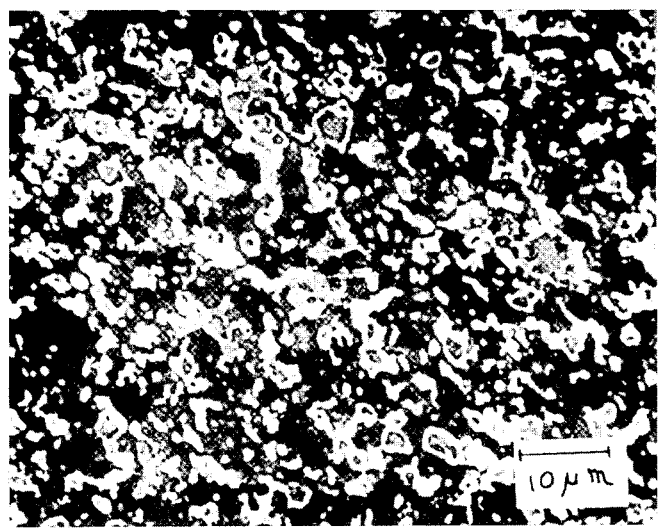

United States Patent [19]

Brun et al.

[11] Patent Number: 4,512,946
[45] Date of Patent: Apr. 23, 1985

[54] MICROCOMPOSITE OF METAL BORIDE AND CERAMIC PARTICLES

[75] Inventors: Milivoj K. Brun, Ballston Lake; Minyoung Lee; Lawrence E. Szala, both of Schenectady, all of N.Y.

[73] Assignee: General Electric Company, Schenectady, N.Y.

[21] Appl. No.: 529,784

[22] Filed: Sep. 6, 1983

[51] Int. Cl.³ .............................................. C04B 35/60
[52] U.S. Cl. ..................................... 264/332; 51/307; 51/309; 501/87; 501/96
[58] Field of Search .................... 264/332; 501/96, 87; 51/309, 307

[56] References Cited

U.S. PATENT DOCUMENTS

| | | | |
|---|---|---|---|
| 2,678,870 | 5/1954 | Cooper | 501/96 |
| 4,022,584 | 5/1977 | Rudy | 51/309 |
| 4,407,968 | 10/1983 | Lee et al. | 501/87 |

*Primary Examiner*—James Derrington
*Attorney, Agent, or Firm*—Jane M. Binkowski; James C. Davis, Jr.; James Magee, Jr.

[57] ABSTRACT

A particulate mixture of ceramic powder, boron and a hydride of a metal selected from the group consisting of hafnium, niobium, tantalum, titanium, vanadium, zirconium and mixtures thereof is hot pressed decomposing the hydride and reacting the resulting metal with boron producing a polycrystalline microcomposite comprised of a continuous phase of the boride of the metal which encapsulates at least about 20% by volume of the ceramic particles and which either encapsulates or is intermixed with the balance of said ceramic particles.

14 Claims, 3 Drawing Figures

MICROCOMPOSITE OF METAL BORIDE AND CERAMIC PARTICLES

The present invention relates to reactive hot pressing and to a polycrystalline microcomposite comprised of a continuous interconnecting phase of metal boride and a phase of ceramic particles.

The importance of microstructure to the properties of ceramic materials has been amply demonstrated. Properties such as strength, electrical conductivity and thermal conductivity can be significantly affected by grain size, shape and orientation. In the case of multiphase materials the spatial distribution (continuity vs. discontinuity) of phases becomes an important factor in addition to parameters already mentioned. For example, the electrical or thermal conductivity of a composite consisting of one good and one poor conductor can have vastly different values depending on whether or not the conducting phase forms a continuous network.

Each processing technique tends to impart a specific type of microstructure to the finished material. Microstructural parameters can, therefore, be manipulated over a reasonable range by controlling processing parameters. In the case of a ceramic-ceramic (brittle-brittle) composite, the number of applicable processing techniques is fairly limited. They typically involve some method of cold forming (pressing extrusion, injection molding, casting), followed by sintering, hot pressing or isostatic hot pressing. Grain size is controlled by powder preparation, control of the sintering cycle, addition of selected impurities etc. Grain shape can be controlled to some extent by processing techniques, but it is also a function of the material and does not lend itself to control as easily as size. Grain orientation (random vs. preferred) depends on a combination of grain shape and processing techniques. The spatial distribution of phases, on the other hand, seems to be more difficult to control. Obtaining one continuous and one discontinuous phase has been demonstrated in cases of materials with widely different melting points (Si/SiC or alumina/glass).

The present invention utilizes reactive hot pressing, a technique which involves hot pressing a mixture of materials which will undergo some type of chemical reaction during the heat treatment. The resulting material will then have the same overall chemical composition as the starting material, but its phase content will be different. This type of process can have some advantages over classical hot pressing, in that the driving force for the reaction can also aid densification of the material. The chemical reaction will commonly involve some type of material transport, which would also have a tendency to accelerate densification. Due to the extra driving force, it may be possible to sinter materials at temperatures lower than required for standard powder processing. Reactive hot pressing can be particularly advantageous when processing materials which are otherwise difficult to sinter, due either to low diffusion rates or to low surface energy.

More specifically, this invention is directed to a process for forming in a limited class of materials a brittle-brittle composite of controlled geometry useable essentially up to its processing temperature. The starting mixture consists of powders of metal hydride, boron and relatively inert ceramic powder mixed together. The ceramic powder should be stable at the processing temperature, and not excessively reactive with the metal boride phase that is formed in situ.

The mixture is then hot pressed. As the temperature is raised, the yield stress of the metal formed by decomposition of the present metal hydride will be overcome at some point by the pressure applied to the die, forcing the metal to fill interstices and surround the grains of the inert phase, i.e. the ceramic powder. As the temperature is raised further, the boron will diffuse into the metal and form metal boride in situ.

A typical example of the present invention is shown in the following reaction:

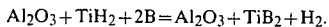

$$Al_2O_3 + TiH_2 + 2B = Al_2O_3 + TiB_2 + H_2.$$

Alumina in the above example does not participate to any significant extent in the reaction. It remains as an inert phase while the reaction between the hydride and boron takes place.

The major advantage of the present method as compared to starting with compounds is that it will yield a polycrystalline microcomposite of hard refractory materials with a continuous metal boride phase which encapsulates at least about 20% by volume of the ceramic particles and which either encapsulates or is intermixed with the balance of the ceramic particles. The ability to produce this type of geometrical microstructure in a refractory composite is a special feature of the present invention. The continuous metal boride phase of the present microcomposite will act as a grain growth inhibitor for the grains of the substantially inert phase, i.e. the ceramic powder. The present microcomposite is electrically conducting and has good thermal conductivity since the conducting phase, i.e. the metal boride phase, is continuous.

Figure 2:
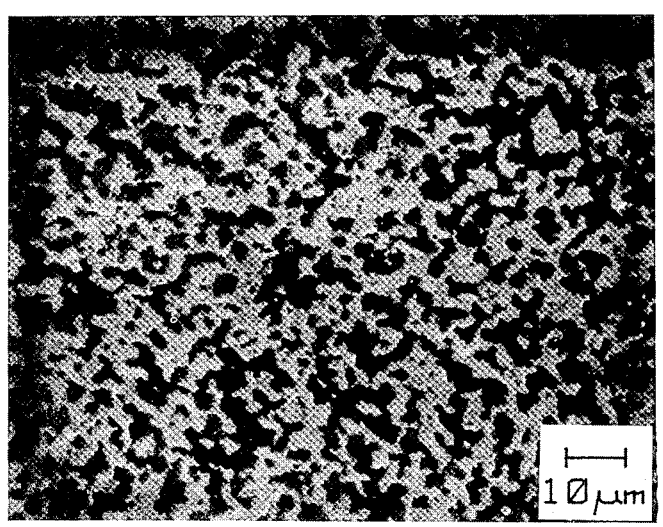
Figure 3:
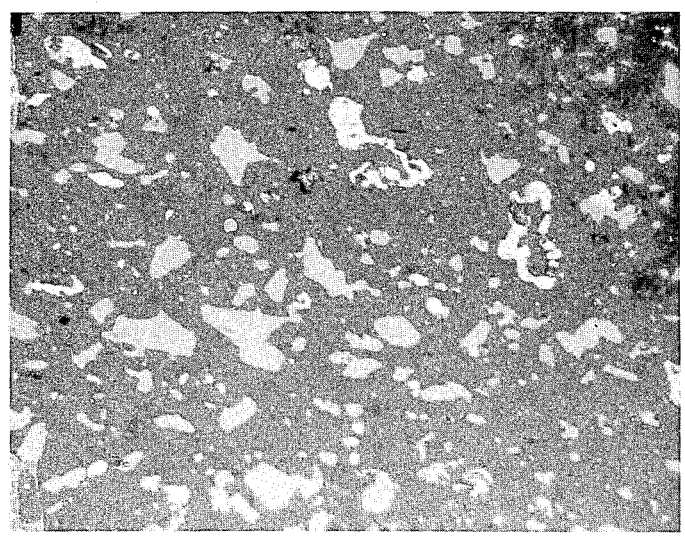

Those skilled in the art will gain a further and better understanding of the present invention from the detailed description set forth below, considered in conjunction with the figures accompanying and forming a part of the specification, in which:

FIG. 1 is a photomicrograph (magnified 1000×) showing the polished cross-section of a microcomposite produced in accordance with the present invention comprised of 60% by volume of $Al_2O_3$ particles (dark phase) and the balance was a continuous interconnecting phase of $ZrB_2$ (light phase);

FIG. 2 is a photomicrograph (magnified 1000×) showing the polished cross-section of a microcomposite produced in accordance with the present invention comprised of 70% by volume of $B_4C$ particles (dark phase) and the balance was a continuous interconnecting phase of $TiB_2$ (light phase); and FIG. 3 is a photomicrograph (magnified 1000×) showing the polished cross-section of a microcomposite formed from a particulate mixture of $Al_2O_3$, boron and zirconium metal powder (instead of zirconium hydride) and shows three phases, the two light or bright phases being related to zirconium and the dark phase was $Al_2O_3$.

Briefly stated, the present process for producing a microcomposite comprises providing a particulate mixture of boron, a hydride of a metal selected from the group consisting of hafnium, niobium, tantalum, titanium, vanadium, zirconium and mixtures thereof, and a ceramic powder, hot pressing the particulate mixture under a pressure of at least about 200 psi at a temperature ranging from about 1200° C. to about 2000° C. decomposing said metal hydride producing said metal and by-product hydrogen gas which vaporizes away and reacting said metal with said boron producing the boride of said metal as a continuous interconnecting phase, said continuous metal boride phase encapsulating at least about 20% by volume of said ceramic particles, and said continuous metal boride phase either encapsulating or being intermixed with the balance of said ceramic particles, said process having no significant effect on said ceramic particles, said continuous metal boride phase formed in situ ranging from about 20% by volume to about 80% by volume of said microcomposite and the balance of said microcomposite being comprised of particles of said ceramic.

The present microcomposite is a polycrystalline body comprised of a continuous interconnecting phase of a boride of a metal selected from the group consisting of hafnium, niobium, tantalum, titanium, vanadium, zirconium, and mixtures thereof and the balance is comprised of ceramic particles, said continuous metal boride phase encapsulating at least about 20% by volume of said ceramic particles and encapsulating or being intermixed with the balance of said ceramic particles, said microcomposite having a density greater than 95% of the theoretical density for said microcomposite, said continuous metal boride phase ranging from about 20% by volume to about 80% by volume of said microcomposite.

The theoretical density of the present microcomposite is the average theoretical density for said continuous metal boride phase and said ceramic particles based on the amounts thereof present.

The present metal hydride is a hydride of a metal selected from the group consisting of hafnium, niobium, tantalum, titanium, vanadium, zirconium and mixtures thereof. The particular metal hydride used depends on the particular continuous interconnecting metal boride phase desired to be formed in the microcomposite.

In the present process, elemental metal cannot be used instead of the metal hydride since it will react with boron to form metal boride before the temperature is reached at which such metal will flow significantly, i.e. about 1150° C. to 1200° C. The formation of such metal boride in a significant amount below about 1150° C. prevents production of the present microcomposite, and more specifically, prevents production of the present continuous interconnecting phase of metal boride.

As used herein, boron includes every form of elemental boron.

The ceramic powder used in the present process as the inert phase in the microcomposite has the characteristic of being stable at the temperatures necessary for processing or it is not significantly affected by the processing temperatures. Also, in the present process, the ceramic powder is relatively inert so that the favored reaction will be between the reactants to form the metal boride in situ. The present process has no significant effect on the ceramic powder.

The particular ceramic powder or mixture of ceramic powders used in the present process depends largely on the particular microcomposite desired, i.e., the particular properties desired in the microcomposite. Representative of the ceramic powder useful in the present invention are the ceramic oxides such as $Al_2O_3$, $HfO_2$, $BeO$, $Cr_2O_3$, $La_2O_3$, $MgO$, $ThO_2$, $UO_2$, $Y_2O_3$, $ZrO_2$, $BaZrO_3$, $BeZr_2O_7$, $ThO_2 \cdot ZrO_2$, $ZrO_2$, and mixtures and solid solutions thereof.

Also useful as the ceramic powder in the present process are the ceramic carbides such as the carbides of boron, hafnium, niobium, tantalum, titanium, vanadium, zirconium, and mixtures and solid solutions thereof.

Still other useful ceramic powders are the ceramic borides such as the borides of hafnium, niobium, tantalum, titanium, vanadium, zirconium, and mixtures and solid solutions thereof. More specifically, representative of the borides are $HfB_2$, $NbB$, $NbB_2$, $TaB$, $TaB_2$, $TiB_2$, $VB$, $VB_2$ and $ZrB_2$.

In carrying out the present process, a particulate uniform or at least a substantially uniform mixture or dispersion of the metal hydride, boron and ceramic powder is formed. The components of the mixture can be of commercial or technical grade. Specifically, they should not contain any impurities which would have a significantly deleterious effect on the properties of the resulting microcomposite, and preferably, the components are at least about 99% pure.

The amounts of metal hydride and boron in the particulate mixture depends on the amount of continuous metal boride phase to be formed in the microcomposite. In the present process, the metal hydride decomposes producing the metal in situ and hydrogen gas which vaporizes away. The metal deforms and flows around the ceramic particles reacting with the boron to produce the present metal boride phase which encapsulates at least about 20% by volume of the ceramic particles.

The metal hydride and boron are used in the stoichiometric amounts required to react to form the continuous phase of metal boride ranging from about 20% by volume to about 80% by volume of the total volume of the microcomposite. Preferably, for use as a cutting tool, the continuous metal boride phase formed in situ ranges from about 20% by volume to about 30% by volume of the total volume of the microcomposite.

The amount of the ceramic powder used also depends on the particular microcomposite desired. In the present process, it is used in an amount which produces a microcomposite wherein the phase of ceramic particles ranges from about 20% by volume to about 80% by volume of the total volume of the microcomposite. Preferably, for use of the microcomposite as a cutting tool, the ceramic powder is used in an amount which produces a microcomposite wherein the phase of ceramic particles ranges from about 70% by volume to about 80% by volume of the microcomposite.

The ceramic powder, boron and metal hydride can be admixed by a number of techniques such as, for example, ball milling, vibratory milling or jet milling, to produce a significantly or substantially uniform or homogeneous dispersion or mixture. The more uniform the mixture, the more uniform is the microstructure, and therefore, the properties of the resulting microcomposite body.

Representative of these mixing techniques is ball milling, preferably with balls of material such as $\alpha$-$Al_2O_3$ which has low wear and which has no significant detrimental effect on the properties desired in the final product. If desired, such milling can also be used to break down any agglomerates and reduce all materials to comparable particle sizes. Milling may be carried out dry or with the charge suspended in a liquid medium inert to the ingredients. Typical liquids include ethyl alcohol and carbon tetrachloride. Milling time varies widely and depends largely on the amount and particle size reduction desired and type of milling equipment. In general, milling time ranges from about 1 hour to about 100 hours. Wet milled material can be dried by a number of conventional techniques to remove the liquid medium.

The present particulate mixture has an average particle size of less than about 15 microns, preferably less than about 10 microns, and most preferably it is about 1 micron or less.

Hot pressing of the particulate mixture is carried out in a non-oxidizing atmosphere. More particularly, hot pressing of the particulate mixture is carried out in a protective atmosphere in which the mixture is inert or substantially inert, i.e. an atmosphere which has no significant deleterious effect on it. Representative of the hot pressing atmospheres is nitrogen, argon, helium or a vacuum. The hot pressing atmosphere can range from a substantial vacuum to atmospheric or ambient pressure.

In carrying out the present process, the particulate mixture is hot pressed under a pressure and temperature and for a sufficient period of time to produce the present microcomposite. Hot pressing temperature ranges from about 1200° C. to about 2000° C. Temperatures lower than about 1200° C. are not sufficiently high to allow formation of the present continuous phase of metal boride which encapsulates at least about 20% by volume of the ceramic particles. On the other hand, temperatures above 2000° C. favor rapid growth of particles or grains and undesirable reactions. The particular hot pressing temperature depends largely on the particular metal boride phase to be formed, and preferably, it ranges from about 1500° C. to about 1800° C.

The heating rate to the present hot pressing temperature should be sufficiently rapid to prevent decomposition of the metal hydride to any significant degree below about 1100° C. and thereby prevent any significant formation of metal boride below about 1200° C. Such heating rate may be as low as about 30° C. per minute, but preferably, it is at least about 50° C. per minute, and most preferably it is about 100° C. per minute. The maximum heating rate in the present process is limited only by the equipment. The formation of metal boride in a significant amount below about 1200° C. prevents production of the present continuous phase of metal boride which encapsulates at least about 20% by volume of the ceramic particles.

The hot pressing pressure can vary and should be at least sufficient to confine the material in the hot press and make the metal boride reaction take place during the present reactive hot pressing. Generally, the minimum hot pressing pressure is about 200 psi and preferably it is about 500 psi. Hot pressing pressure can range to a maximum pressure which is limited by the available pressing equipment. Most preferably, hot pressing pressure ranges from about 1000 psi to about 8000 psi.

In the present process, there is no significant loss of ceramic powder or of the reactants forming the continuous phase of metal boride, i.e. the reactant metal formed in situ and boron.

The present polycrystalline microcomposite is comprised of a continuous interconnecting phase of the present metal boride and a phase of the present ceramic particles. The phases are distributed uniformly, substantially uniformly or at least significantly uniformly in the microcomposite. The microcomposite has a uniform, substantially uniform or at least a significantly uniform microstructure.

The phase of ceramic particles in the present microcomposite is comprised of individual grains as well as clusters of the grains. Ordinarily, a cluster is comprised of less than about 10 grains. Generally, more than about 50% by volume and preferably more than about 90% by volume of the ceramic particles in the microcomposite is comprised of individual ceramic grains and the balance is comprised of clusters.

In the present microcomposite, the ceramic particles have an average particle size of less than about 15 microns, preferably less than about 10 microns, more preferably, less than about 5 microns, and most preferably, it is about 1 micron.

In the present microcomposite, the metal boride phase formed in situ has an average grain size of less than about 15 microns, preferably less than about 10 microns, more preferably less than about 5 microns and most preferably it is about 1 micron or less.

In the present microcomposite the continuous metal boride phase formed in situ encapsulates at least about 20% by volume, preferably at least about 50% by volume, and most preferably more than 90% by volume of the ceramic particles. By such encapsulation, it is meant that the metal boride phase formed in situ encapsulates the individual ceramic grains and/or it encapsulates the individual cluster of ceramic grains.

Preferably, the present microcomposite has a density greater than 98% and most preferably greater than 99% of the theoretical density for the microcomposite.

Since the present microcomposite has a continuous interconnecting network of the present metal boride, it is electrically conducting. It is expected that the present microcomposite would have an electrical conductivity at least about 20% higher than that of a composite of the same composition produced by conventional hot pressing of mixtures of ceramic powders and metal boride powders.

For most applications, the volume fraction of ceramic particles in the present microcomposite ranges from about 45% to about 80%. For use as a cutting tool, the volume fraction of ceramic particles in the present microcomposite ranges from about 70% to about 80%. Also, preferably, for use as a hard cutting tool, the present microcomposite is comprised of alumina particles and titanium diboride.

The particular composition, grain or particle size, of the present microcomposite depends largely on its application. The present product is useful as a general wear part such as a nodule or a guide pin. It could be useful as a high temperature electrode material. It is particularly useful as a cutting medium. Specifically, the present product is useful as a tool insert which, for example, can be held by a tool shank adapted to be held in a machine tool whereby it can be used for direct machining.

The invention is further illustrated by the following examples where the following procedure was used unless otherwise noted:

All heating was carried out under the given constant pressure, and at the end of the heating cycle, pressure was released and the resulting microcomposite was furnace-cooled to about room temperature without pressure.

All of the heating and cooling was carried out under a protective atmosphere of nitrogen gas.

Rockwell A hardness ($R_a$) was determined according to ASTM Designation: E 18-74.

EXAMPLE 1

A mixture of 70 grams of $Al_2O_3$ powder with an average particle size of about $0.3\mu$, 21 grams of titanium hydride with an average particle size of about $2\mu$, and 9 grams of boron (−325 mesh) was ball milled with high purity alumina balls in acetone at room temperature for 72 hours in a plastic container. The mixture was milled in acetone to prevent excessive oxidation and to insure proper dispersion of powder. The resulting milled particulate mixture was dried in air at room temperature. The dried particulate mixture appeared to have an average particle size which was submicron.

15 grams of the dried particulate mixture was compressed in a steel die without plasticizers at room temperature at 20 K. psi. The resulting compact was in the form of a pellet approximately 1 inch in diameter and ¼ inch thick. The pellet was inserted into a high strength graphite die coated with BN powder and heated under a constant pressure of 4400 psi in 15 minutes to 1710° C., and held at temperature until movement of the rams stopped which was about five minutes. Pressure was released at the same time as power was turned off and the sample was furnace-cooled to room temperature.

The resulting polycrystalline microcomposite was comprised of $Al_2O_3$ phase and titanium diboride phase. Phase composition was established by X-ray diffraction and by microprobe analysis. Metallographic examination of a polished cross-section of the resulting microcomposite showed that it had a density greater than about 97.5% of the theoretical density for the microcomposite. The microcomposite was comprised of about 72.5% by volume of $Al_2O_3$ phase and the balance was titanium diboride phase. Both phases were distributed substantially uniformly in the microcomposite. The titanium diboride phase was continuous, interconnecting and encapsulated about 30% by volume of the $Al_2O_3$ particles. The balance of the $Al_2O_3$ particles was intermixed with the titanium diboride phase.

The average particle size of the $Al_2O_3$ particles in the microcomposite was about 3 microns. The average grain size of the titanium diboride phase was about 1 to 1.5 microns.

The microcomposite had a Rockwell C hardness of 93.4 and would be useful as a cutting tool.

By comparison, a sample of the same nominal composition, but prepared from $Al_2O_3$ and $TiB_2$ powders under the same conditions, exhibited a microstructure with isolated $TiB_2$ grains, had a density 94% of theoretical and a Rockwell A hardness of 91.3.

EXAMPLE 2

A mixture of 24.8 grams of $Al_2O_3$ powder with an average particle size of about $0.3\mu$, 20.8 grams of zirconium hydride with an average particle size of about $2\mu$, 4.8 grams boron (−325 mesh) and 0.1 gram MgO was ball milled in acetone at room temperature with alumina balls for 72 hours in a plastic container. The milled mixture was dried in air at room temperature and put through a 100 mesh sieve.

Seventeen grams of the dried mixture were pressed into a pellet in substantially the same manner as disclosed in Example 1 and was of substantially the same size.

The pellet was hot pressed in substantially the same manner as disclosed in Example 1. A pressure of 4400 psi was maintained throughout the heating. A maximum temperature of 1710° C. was reached in 15 minutes and maintained until shrinkage of the pellet ceased, after which pressure was released and the sample was furnace cooled to room temperature.

X-ray diffraction of the resulting polycrystalline microcomposite confirmed the existence of only two phases, i.e. $Al_2O_3$ and $ZrB_2$.

A polished cross-section of the resulting polycrystalline microcomposite is shown in FIG. 1 where the $Al_2O_3$ particles are the dark phase and $ZrB_2$ is the light phase.

Metallographic examination of the polished cross-section showed that it was comprised of about 60% by volume of $Al_2O_3$ phase and the balance was $ZrB_2$ phase. The phases were distributed substantially uniformly in the microcomposite. The $ZrB_2$ phase was continuous, interconnecting and encapsulated about 40% by volume of the $Al_2O_3$ particles and was intermixed with the balance of the $Al_2O_3$ particles.

The average size of the $Al_2O_3$ particles in the microcomposite was about 3 microns and the average grain size of the $ZrB_2$ was on the order of about 1 micron.

Other experiments have shown that the MgO appeared not to be required to prevent grain growth.

The microcomposite had a density greater than 95% of its theoretical density, a Rockwell A hardness of 92.9 and would be useful as a cutting tool. Also, it was a good electrical conductor.

EXAMPLE 3

A mixture of 34 grams of $B_4C$ with a particle size ranging from about $1\mu$ to $5\mu$, 18.7 grams of $TiH_2$ with an average particle size of about $2\mu$, and 8.1 grams of boron (−325 mesh) was milled at room temperature with cemented carbide balls under acetone in a cemented carbide ball mill for 15 hours. The mixture was dried and sieved through 100 mesh screen.

The dried mixture was pressed into a pellet about 1" in diameter and ¼" thick in a steel die at room temperature at 20 K. psi. The pellet was transferred into a graphite die lined with Grafoil for hot pressing. Hot pressing conditions were 1850° C. and 4400 psi. The 1850° C. temperature was reached in about 15 minutes and maintained for 5 minutes, after which the sample was furnace cooled to room temperature.

The resulting polycrystalline microcomposite was comprised of 70% by volume of $B_4C$ and the balance was $TiB_2$ as the only phases.

A polished cross-section of the microcomposite is shown in FIG. 2 and it can be seen that particles of $B_4C$ (dark phase) are completely encapsulated by $TiB_2$ (light phase).

Metallographic examination of the polished cross-section of the microcomposite showed that it was comprised of a continuous interconnecting phase of $TiB_2$ which encapsulated about 80% by volume of the $B_4C$ particles and which was intermixed with the balance of the $B_4C$ particles. The average particle size of the $B_4C$ particles was on the order of about 2 to 3 microns. The average grain size of the titanium diboride phase was about under one micron.

The microcomposite had a density greater than 99% of its theoretical density and Ra was 94.3. It was useful as a cutting tool.

The cutting performance of the microcomposite was tested on titanium, at 600 sfm, 0.03" DOC and 0.009"/rev feed. The reference tool, Carboloy grade 883 carbide, exhibited lower uniform flank wear in the first minute of cutting, but lifetime was limited to less than 2 minutes due to the edge failure. The present test tool exhibited higher uniform flank wear initially, but survived to the end of the three minute test. The edge wear increased linearly with the square root of time, which corresponds to the constant volume loss per the unit length of cut.

EXAMPLE 4

A mixture of 19.3 grams of $B_4C$, 25.6 grams of $ZrH_2$ and 5.9 grams of boron was ground at room temperature in polyethylene jar with zirconia balls, in acetone, followed by grinding in cemented carbide mill with carbide balls. The mixture was then dried and sieved through a 100 mesh sieve.

The dried mixture was pressed into a pellet and hot pressed in substantially the same manner as disclosed in Example 3.

The resulting polycrystalline microcomposite was comprised of 40% by volume of $ZrB_2$ and the balance was $B_4C$.

Metallographic examination of the polished cross-section of the microcomposite showed that it was comprised of a continuous interconnecting phase of $ZrB_2$ which encapsulated about 80% by volume of the $B_4C$ particles and which was intermixed with the balance of the $B_4C$ particles. The average particle size of the $B_4C$ particles was about 3 microns. The average grain size of the zirconium diboride phase was under one micron.

The microcomposite had a density greater than 99% of its theoretical density. It would be useful as a cutting tool.

EXAMPLE 5

14.2 grams of alumina with an average particle size of 0.3 microns, 34.3 g of titanium hydride with an average particle size of 2 microns and 14.9 grams of boron (−325 mesh) were ball milled at room temperature in cemented carbide ball mill with carbide balls for 15 hours in acetone. The mixture was dried and pressed into a ½″ cylinder at room temperature in steel die at 15000 psi.

The resulting pellet was transferred into graphite die and hot pressed at 1550° C. and a pressure of 5000 psi until all shrinkage stopped. The sample was furnace cooled to room temperature.

The resulting microcomposite was comprised of about 25% by volume of $Al_2O_3$ and the balance was $TiB_2$.

Metallographic examination of a polished cross-section of the microcomposite showed that about 100% by volume of the $Al_2O_3$ particles was encapsulated by the titanium diboride phase which was continuous and interconnecting. However, the polished cross-section showed areas which were fully densified but between those areas were areas of fairly high porosity. Approximately 20% by volume of the microcomposite was porous and the balance had a density greater than about 95%.

It is believed that a fully densified product would have been produced if a vacuum had been used instead of nitrogen as a protective atmosphere since the porosity is believed to be due to the large volume of hydrogen evolving from the decomposition of the large amount of titanium hydride.

EXAMPLE 6

6.768 grams of boron carbide ranging from about 1μ to 5 microns, 34.7 grams of titanium hydride with an average size of 2 microns, and 15 grams of boron were ball milled in cemented carbide ball mill with cemented carbide balls at room temperature for 15 hours in acetone. The mixture was dried and pressed into a ½″ dia. cylinder at 15000 psi at room temperature.

The cylinder was transferred to a graphite die and hot pressed at 1680° C. and 5000 psi until movement of the rams stopped. The sample was furnace cooled to room temperature.

The resulting microcomposite was comprised of about 20% by volume of boron carbide and the balance was $TiB_2$.

Metallographic examination of a polished cross-section of the microcomposite showed that about 100% by volume of the boron carbide particles was encapsulated by the titanium diboride phase which was continuous and interconnecting. However, the polished cross-section showed areas which were fully densified but between those areas were areas of fairly high porosity. More specifically, approximately 20% by volume of the microcomposite was porous and the balance had a density greater than about 95%.

It is believed that a fully densified product would have been produced if a vacuum had been used instead of nitrogen as a protective atmosphere since the porosity is believed to be due to the large volume of hydrogen evolving from the decomposition of the large amount of titanium hydride.

EXAMPLE 7

A microcomposite was prepared in substantially the same manner and with the same nominal composition as disclosed in Example 3. It had an electrical resistivity of $0.38 \times 10^{-3}$ ohm-cm at room temperature.

For comparison purposes, a conventionally hot pressed product was produced from a particulate mixture of 30% by volume $TiB_2$ and 70% by volume boron carbide which was pressed into a pellet and hot pressed under substantially the same conditions disclosed in Example 3. The resulting hot pressed product had an electrical resistivity of $0.609 \times 10^{-3}$ ohm-cm at room temperature.

Since boron carbide is not an electrical conductor, the lower electrical resistivity, i.e. higher conductivity, of the present microcomposite indicates that the titanium diboride phase therein was substantially more continuous and interconnecting than that of the conventional hot pressed product.

EXAMPLE 8

24.8 grams of alumina with an average particle size of about 0.3 microns, 20.4 grams of zirconium metal powder (−80 mesh) and 4.8 grams of boron (−325 mesh) were ball milled in cemented carbide ball mill with carbide balls for 12 hours at room temperature in acetone. The mixture was dried and sieved through 60 mesh sieve.

The dried mixture was pressed in a steel die at room temperature at 10000 psi into a 1″ diameter pellet and transferred into a graphite die for hot pressing.

Hot pressing was conducted at 1790° C. for 2 minutes, with heating rate of 100 C./min. Pressure of 4400 psi was maintained through the entire heating cycle.

A polished cross-section of the resulting product is shown in FIG. 3 which shows three phases. FIG. 3 shows that most of the alumina particles (dark phase) were not encapsulated by the boride. The two light colored phases in FIG. 3 are related to zirconium.

In copending U.S. patent application Ser. No. 529,783 entitled Microcomposite of Metal Carbide and Ceramic Particles, filed of even date herewith in the names of Milivoj Konstantin Brun, Minyoung Lee and Lawrence Edward Szala and assigned to the assignee hereof and incorporated herein by reference, there is disclosed that a particulate mixture of ceramic powder, free carbon and a hydride of a metal selected from the group consisting of hafnium, niobium, tantalum, titanium, vanadium, zirconium and mixtures thereof is hot pressed decomposing the hydride and reacting the resulting metal with carbon producing a polycrystalline microcomposite comprised of a continuous phase of the carbide of the metal which encapsulates at least about 20% by volume of the ceramic particles and which either encapsulates or is intermixed with the balance of said ceramic particles.

What is claimed is:

1. A process for producing a polycrystalline microcomposite consisting essentially of a continuous interconnecting phase of a boride of a metal selected from the group consisting of hafnium, niobium, tantalum, titanium, vanadium, zirconium and mixtures thereof and a phase of ceramic particles, said phases being distributed at least significantly uniformly in said microcomposite, said microcomposite having a density greater than 95% of the theoretical density for said microcomposite, which consists essentially of forming a particulate mixture of boron, a hydride of a metal selected from the group consisting of hafnium, niobium, tantalum, titanium, vanadium, zirconium and mixtures thereof, and a ceramic powder, hot pressing the particulate mixture under a pressure of at least about 200 psi at a temperature ranging from about 1200° C. to about 2000° C. decomposing said hydride of said metal producing said metal and by-product gas which vaporizes away and reacting said metal with said boron producing the boride of said metal as a continuous interconnecting phase, said continuous metal boride phase encapsulating at least about 20% by volume of said ceramic particles and either encapsulating or being intermixed with the balance of said ceramic particles, said process having no significant effect on said ceramic particles, said continuous interconnecting metal boride phase ranging from about 20% by volume to about 80% by volume of said microcomposite and the balance of said microcomposite consisting essentially of particles of said ceramic.

2. The process according to claim 1 wherein said metal is hafnium.

3. The process according to claim 1 wherein said metal is niobium.

4. The process according to claim 1 wherein said metal is tantalum.

5. The process according to claim 1 wherein said metal is titanium.

6. The process according to claim 1 wherein said metal is vanadium.

7. The process according to claim 1 wherein said metal is zirconium.

8. The process according to claim 1 wherein said ceramic powder is $Al_2O_3$.

9. The process according to claim 1 wherein said continuous metal boride phase encapsulates more than 90% by volume of said ceramic particles.

10. A process for producing a microcomposite consisting essentially of a continuous interconnecting phase of titanium diboride and a phase of ceramic particles, said phases being distributed at least significantly uniformly in said microcomposite, said microcomposite having a density greater than 95% of the theoretical density for said microcomposite, which consists essentially of forming a particulate mixture of boron, titanium hydride and a ceramic powder, hot pressing the particulate mixture under a pressure of at least about 200 psi at a temperature ranging from about 1200° C. to about 2000° C. decomposing said titanium hydride producing titanium and by-product gas which vaporizes away and reacting said titanium with said boron producing titanium diboride as a continuous interconnecting phase, said continuous titanium diboride phase encapsulating at least about 20% by volume of said ceramic particles and either encapsulating or being intermixed with the balance of said ceramic particles, said process having no significant effect on said ceramic particles, said continuous titanium diboride phase ranging from about 20% by volume to about 30% by volume of said microcomposite and the balance of said microcomposite consisting essentially of particles of said ceramic.

11. The process according to claim 10 wherein said titanium diboride phase encapsulates more than 90% by volume of said ceramic particles.

12. The process according to claim 10 wherein said ceramic particles are $Al_2O_3$.

13. The process according to claim 1 wherein said microcomposite has a density greater than 98% of the theoretical density for said microcomposite.

14. The process according to claim 10 wherein said microcomposite has a density greater than 98% of the theoretical density for said microcomposite.

* * * * *